United States Patent
Bienvenu et al.

(10) Patent No.: US 10,737,343 B2
(45) Date of Patent: Aug. 11, 2020

(54) METHOD FOR PRODUCING AN ESPECIALLY LARGE AERONAUTICAL PART

(71) Applicant: SAFRAN NACELLES, Gonfreville l'Orcher (FR)

(72) Inventors: Philippe Bienvenu, Gonfreville l'Orcher (FR); Helene Malot, Gonfreville l'Orcher (FR); Charlotte Julienne, Gonfreville l'Orcher (FR)

(73) Assignee: SAFRAN NACELLES, Gonfreville l'Orcher (FR)

( * ) Notice: Subject to any disclaimer, the term of this patent is extended or adjusted under 35 U.S.C. 154(b) by 261 days.

(21) Appl. No.: 15/468,138

(22) Filed: Mar. 24, 2017

(65) Prior Publication Data
US 2017/0203378 A1      Jul. 20, 2017

Related U.S. Application Data

(63) Continuation of application No. PCT/FR2015/052854, filed on Oct. 23, 2015.

(30) Foreign Application Priority Data

Oct. 23, 2014   (FR) ..................................... 14 60210

(51) Int. Cl.
*B23K 1/00* (2006.01)
*B23K 1/008* (2006.01)
(Continued)

(52) U.S. Cl.
CPC ............ *B23K 1/0018* (2013.01); *B23K 1/008* (2013.01); *B23K 1/0014* (2013.01); *B23K 1/19* (2013.01);
(Continued)

(58) Field of Classification Search
CPC .... B23K 1/0018; B23K 1/008; B23K 1/0014; B23K 1/19; B23K 3/053; B23K 3/0471; Y10T 29/4932; Y10T 29/49826
See application file for complete search history.

(56) References Cited

U.S. PATENT DOCUMENTS 3,088,019 A * 4/1963 Crump ................. B23K 1/0014
                                                         219/85.17
3,091,684 A * 5/1963 Cochran .............. B23K 1/0014
                                                         219/85.17
(Continued)

FOREIGN PATENT DOCUMENTS

WO      2014/020286      2/2014

OTHER PUBLICATIONS

English Translation Francisco WO 2014020286 A1 (Year: 2014).*
International Search Report for International Application PCT/FR2015/052854, dated Feb. 10, 2016.

*Primary Examiner* — Jason L Vaughan
*Assistant Examiner* — Amanda Kreiling
(74) *Attorney, Agent, or Firm* — Burris Law, PLLC

(57) ABSTRACT

The present disclosure relates to a method for producing a final metal part for a nacelle of a turbojet. The method includes brazing at least two parts, one being an inner part having an inner surface and the other being an outer part having an outer surface. The method further includes a step of heating the outer surface of the outer part using an external heating means, and a step of heating the inner surface of the inner part using an internal heating means.

9 Claims, 1 Drawing Sheet

(51) Int. Cl.
  *B23K 1/19* (2006.01)
  *B23K 3/047* (2006.01)
  *B23K 3/053* (2006.01)
  *F01D 25/24* (2006.01)
  *B23K 103/14* (2006.01)
  *F02K 1/78* (2006.01)

(52) U.S. Cl.
  CPC ............ B23K 3/0471 (2013.01); B23K 3/053 (2013.01); F01D 25/24 (2013.01); *B23K 2103/14* (2018.08); *F02K 1/78* (2013.01); *F05D 2230/237* (2013.01); *F05D 2300/133* (2013.01)

(56) References Cited

U.S. PATENT DOCUMENTS

| | | | | |
|---|---|---|---|---|
| 3,091,845 A | * | 6/1963 | Herman | ................ B21D 47/00 228/181 |
| 3,284,607 A | | 11/1966 | Wernz et al. | |
| 3,612,387 A | * | 10/1971 | Rathbun | ............. B23K 1/0014 228/6.1 |

* cited by examiner

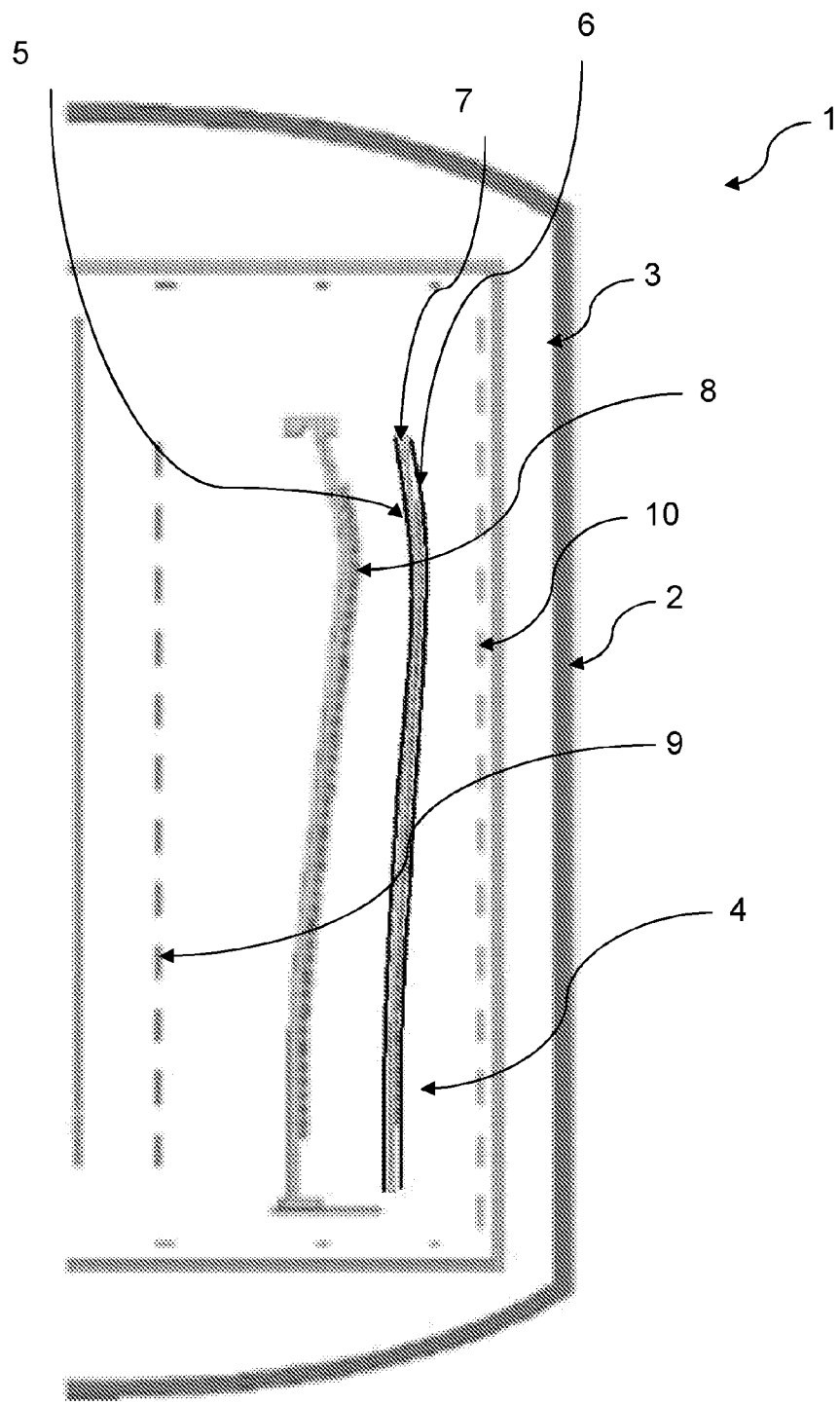

METHOD FOR PRODUCING AN ESPECIALLY LARGE AERONAUTICAL PART

CROSS-REFERENCE TO RELATED APPLICATIONS

This application is a continuation of International Application No. PCT/FR2015/052854, filed on Oct. 23, 2015, which claims priority to and the benefit of FR 14/60210 filed on Oct. 23, 2014. The disclosures of the above applications are incorporated herein by reference.

FIELD

The present disclosure relates to a brazing tooling assembly for manufacturing a metal part and to a manufacturing method of such a part.

BACKGROUND

The statements in this section merely provide background information related to the present disclosure and may not constitute prior art.

Brazing tools are in particular applied in the field of aeronautics, and more particularly for manufacturing revolution parts, or having two complex surfaces, for example closed surfaces, in particular revolution surfaces, to be put opposite to each other, such as gas ejection cones for aircraft turbojet engine or IFS (Internal Fixed Structure).

In a known manner, the brazing is a technique for the assembly of two materials.

There is known the brazing method carried out using a filling metal of a different nature having a melting temperature lower than the melting temperature of the materials to be assembled and capable of properly wetting the surfaces of said materials. In practice, the brazing is carried out by interposition of the filling metal between the two components to be assembled, the area to be brazed being then heated at a temperature allowing the melting of the filling metal but not the melting of the components to be assembled. The liquefied filling metal wets the surfaces of the two components to be assembled and is then cooled so as to solidify between the two components in order to ensure the link therebetween.

The filling metal is generally tin, copper, silver, aluminum, nickel or else precious metal alloys.

It is also known from the prior art a brazing tooling using a gas pressure. Such a device comprises a cylindrical central barrel constituting gas chamber, contained in a counter-shape on which a sealing device consisting of upper and lower flanges is fastened by screwing. The pressure is applied on an inner cylindrical skin, causing the plating of said skin on a honeycomb structure, then of the assembly consisting of the inner skin and the honeycomb on an outer skin. Then, the cylindrical assembly inner skin/honeycomb structure/outer skin is deformed under the effect of the pressure until meeting the counter-shape whose inner surface takes the desired final shape.

Such devices have disadvantages in particular in that the use of a metal brazing tooling involves an additional cost of the thermal cycle related to the inertia of the tooling and to the inertia of the metal to be brazed; the use of a brazing tooling by gas pressure has in particular the disadvantage that it involves an additional cost to carry out the gas sealing, as well as technical difficulties such as the control of the pressure, time and temperature parameters, in order to avoid a crushing of the honeycomb and to optimize the marking phenomenon of the honeycomb (telegraphing) on the skin.

On the other hand, the brazing techniques of the prior art for large-sized parts have the disadvantage of a significant temperature gradient during the heating of the parts to be brazed, which in particular extends the thermal cycle time and involves an additional cost due to the fact that the desired temperatures for the brazing must be greater.

SUMMARY

The present disclosure provides a method for manufacturing a metal final part of turbojet engine nacelle comprising a brazing having at least two parts, one being an inner part having an inner surface and the other part being an outer part having an outer surface, the method comprising a heating step of the outer surface of the outer part by an outer heating means and being noteworthy in that it comprises a heating step of the inner surface of the inner part by an inner heating means.

According to other optional technical characteristics of the present disclosure taken alone or according to all possible combinations, the manufacturing method according to the present disclosure comprises:

the step of heating the inner surface of the inner part by an inner heating means takes place simultaneously in the heating step of the outer surface of the outer part by an outer heating means;

the heating steps of the parts are carried out at a speed of 8 to 100 degrees Celsius per minute on the parts and a brazing tooling;

a cooling step by a gas of at least one heating means;

the cooling step is carried out by means of an inert gas;

the cooling step is carried out by means of argon and/or nitrogen;

the cooling step may be carried out under a cooling gas pressure comprised between 1.1 and 6.5 bar;

the metal final part is manufactured from titanium;

the metal final part is a revolution part;

the metal final part is an inner fixed structure;

a heating step at a temperature greater than necessary so as to reduce the brazing cycle time.

The present disclosure also provides a brazing device implementing the method of the present disclosure, which may comprise an inner heating means.

The brazing device has dimensions adapted to the brazing of large-sized revolution parts, such as revolution parts having a height comprised between 2.4 and 3.6 meters, and in one form approximately 3 meters and a diameter comprised between 2 and 3 meters, and in another form approximately 2.5 meters, for masses of parts which can reach 9 tons, the mass is in one form between 3 and 8 tons. During the brazing, such parts may have a temperature gradient of 20 degrees Celsius.

Advantageously, the brazing device allows reaching temperatures up to 1200 degrees Celsius, and the brazing temperature is comprised between 700 and 1100 degrees Celsius.

Advantageously, the brazing device is a revolution device, and its height can be up to 4 meters and its diameter is advantageously sized to fit on the outer shape of the brazed final part.

The present disclosure enables the brazing device to be free of a thermal bell, considerably reducing the temperature gradient and the brazing cycle time, in particular by eliminating at least one homogenization stage of the temperature of the parts to be brazed. The present disclosure also provides for reducing the temperature during the heating step at a temperature greater than necessary (called overshoot step). The present disclosure further provides for the brazing of large-sized parts, insofar as for the manufacture of metal large-sized parts, the homogenization of the temperature is improved, and the large-sized parts, in one form, made of titanium. Additionally, the present disclosure allows reducing the manufacturing costs of such large-sized parts of a nacelle of an aircraft.

Further areas of applicability will become apparent from the description provided herein. It should be understood that the description and specific examples are intended for purposes of illustration only and are not intended to limit the scope of the present disclosure.

DRAWINGS

In order that the disclosure may be well understood, there will now be described various forms thereof, given by way of example, reference being made to the accompanying drawings, in which:

FIG. 1 is a schematic representation of a brazing device for manufacturing a metal final part according to one form of the present disclosure.

The drawings described herein are for illustration purposes only and are not intended to limit the scope of the present disclosure in any way.

DETAILED DESCRIPTION

The following description is merely exemplary in nature and is not intended to limit the present disclosure, application, or uses. It should be understood that throughout the drawings, corresponding reference numerals indicate like or corresponding parts and features.

With reference to FIG. 1, there is described a brazing device 1 comprising an furnace 2 having an inner wall 3 whose shape constitutes the outer shape of the metal final part to be produced.

The furnace 2 may have a cylindrical bulk.

The furnace 2 may be under vacuum.

The furnace 2 comprises an outer heating means 10 which may be one or more outer network(s) of heating resistors 10, for example an outer network of heating resistors 10.

In this form, the metal final part to be produced is an acoustic sandwich structure 4 of revolution comprising two skins, one being an acoustically reflective skin 5 and the other being an acoustically transparent skin 6 between which a honeycomb structure 7 is interposed. The acoustic sandwich structure 4 is a component of an inner fixed structure (IFS or Internal Fixed Structure) intended to form the roll of the inner fixed structure.

The brazing device 1 further comprises an inner brazing tool 8 whose diameter may be slightly lower than the diameter of the part to be deformed and to be brazed on an already deformed and brazed part, if desired. In the example shown in FIG. 1, the diameter of the inner tool 8 is slightly lower than the diameter of the acoustically reflective skin 5.

The outer network of heating resistors 10 is operable to heat the outer surface of the acoustically transparent skin 6, the honeycomb structure 7 and the acoustically reflective skin 5 to allow the brazing, in the example of FIG. 1, of the acoustically reflective skin 5 and the acoustically transparent skin on the honeycomb structure 7.

Furthermore, the brazing device 1 comprises an inner heating means 9 which may be one or more inner network(s) of heating resistors 9, for example, an inner network of heating resistors 9 operable to heat the inner tool 8 and the inner surface of the acoustically reflective skin 5 to cause a differential expansion of the inner tool 8 which thus allows shaping, sizing, and promotes the acoustically reflective skin 5 to come alongside the acoustically transparent skin 6 with the honeycomb structure 7 during the brazing.

During the brazing, the acoustically reflective skin 5 comes alongside the honeycomb structure 7 such that its outer surface comes into contact and takes the shape of the surface of the opposite honeycomb structure 7, while the acoustically transparent skin 6 comes alongside the honeycomb structure 7 so that its inner surface comes into contact and takes the shape of the surface of the opposite honeycomb structure 7.

In one form, the acoustically reflective and transparent skins 6 may be manufactured from titanium.

The inner 9 and outer 10 networks of heating resistors heat simultaneously the parts to be brazed 5, 6 and 7 and the inner tool 8.

Thus, due to the presence of an inner network of heating resistors 9 besides the outer network of heating resistors 10, and the simultaneous heating thereof for the brazing of the acoustic sandwich structure, the temperature gradients and the heating times are reduced between two points located at any location on the acoustically reflective 5 and/or transparent 6 skins and/or the honeycomb structure 7.

Such a brazing device provides for reducing the brazing cycle time and reducing the brazing temperatures due to the fact that the parts to be brazed are better heated and in more homogeneous manner.

It goes without saying that the present disclosure is not limited to the variations described above by way of example but it comprises all technical equivalents and the variants of the means described above as well as the possible combinations thereof.

The description of the disclosure is merely exemplary in nature and, thus, variations that do not depart from the substance of the disclosure are intended to be within the scope of the disclosure. Such variations are not to be regarded as a departure from the spirit and scope of the disclosure.

What is claimed is:

1. A method for manufacturing an acoustic structure of a turbojet engine nacelle, the method comprising:
    brazing an inner acoustically reflective skin and an outer acoustically transparent skin to a honeycomb structure, the inner acoustically reflective skin and an outer acoustically transparent skin each comprising an inner surface and an outer surface;
    heating the outer acoustically transparent skin by an outer network of heater resistors; and
    heating an inner tool spaced a distance from the inner acoustically reflective skin by an inner network of heating resistors, the heated inner tool heating the inner acoustically reflective skin.

2. The method according to claim 1, wherein the step of heating the inner surface of the inner part by the inner heating means is simultaneous with the heating step of the outer surface of the outer part by the outer heating means.

3. The method according to claim 1, further comprising a cooling step by a gas.

4. The method according to claim 3, wherein the gas is an inert gas.

5. The method according to claim 3, wherein the gas is argon.

6. The method according to claim 1, wherein the metal final part is manufactured from titanium.

7. The method according to claim 1, wherein the metal final part is a revolution part.

8. The method according to claim 1, wherein the metal final part is an inner fixed structure.

9. The method according to claim 1, further comprising a heating step at a brazing temperature between 700 and 1100 degrees Celsius.

* * * * *